(12) United States Patent
Ante et al.

(10) Patent No.: US 11,132,289 B2
(45) Date of Patent: Sep. 28, 2021

(54) METHOD AND SYSTEM FOR IMPROVED PERFORMANCE OF A VIDEO GAME ENGINE

(71) Applicant: Unity IPR ApS, Copenhagen K (DK)

(72) Inventors: Joachim Christoph Ante, Copenhagen (DK); Tim Johansson, Vintrie (SE)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 16/814,921

(22) Filed: Mar. 10, 2020

(65) Prior Publication Data

US 2020/0278924 A1 Sep. 3, 2020

Related U.S. Application Data

(63) Continuation of application No. 16/006,610, filed on Jun. 12, 2018, now Pat. No. 10,599,560.

(51) Int. Cl.
| | |
|---|---|
| *G06F 12/02* | (2006.01) |
| *A63F 13/00* | (2014.01) |
| *G06F 8/30* | (2018.01) |
| *A63F 13/77* | (2014.01) |
| *A63F 13/67* | (2014.01) |
| *G06F 9/50* | (2006.01) |
| *G06F 9/448* | (2018.01) |

(52) U.S. Cl.
CPC .......... *G06F 12/0223* (2013.01); *A63F 13/00* (2013.01); *A63F 13/77* (2014.09); *G06F 8/315* (2013.01); *A63F 2300/60* (2013.01); *A63F 2300/8082* (2013.01); *G06F 2212/15* (2013.01)

(58) Field of Classification Search
None
See application file for complete search history.

(56) References Cited

U.S. PATENT DOCUMENTS

| | | | |
|---|---|---|---|
| 7,853,615 B2 * | 12/2010 | Liu | .................. H04L 67/38 |
| | | | 707/791 |
| 7,912,869 B1 | 3/2011 | Jas | |
| 10,599,560 B2 | 3/2020 | Ante et al. | |
| 2009/0019249 A1 | 1/2009 | Kessler | |

(Continued)

FOREIGN PATENT DOCUMENTS

KR  102124561 B1  6/2020

OTHER PUBLICATIONS

U.S. Appl. No. 16/006,610, Advisory Action dated Jul. 18, 2019, 3 pgs.

(Continued)

*Primary Examiner* — Michael Alsip
(74) *Attorney, Agent, or Firm* — Schwegman Lundberg & Woessner, P.A.

(57) ABSTRACT

Methods and apparatuses to improve the performance of a video game engine using an Entity Component System (ECS) are described herein. In accordance with an embodiment, the ECS creates and uses entities, to represent game objects, which are constructed entirely using value data types. The ECS constructs the entities within a memory in a densely packed linear way, and whereby the ECS constantly monitors (e.g., during game play) objects within a game and adjusts the entity distribution within the memory so that a maximum density of memory usage is maintained in real time as the game is being played.

17 Claims, 15 Drawing Sheets

(56) References Cited

U.S. PATENT DOCUMENTS

| | | | | |
|---|---|---|---|---|
| 2014/0157259 | A1* | 6/2014 | Dow | G06F 9/45558 |
| | | | | 718/1 |
| 2016/0379116 | A1 | 12/2016 | Lottini | |
| 2017/0154095 | A1 | 6/2017 | Milijasevic | |
| 2017/0177543 | A1 | 6/2017 | Jha et al. | |
| 2018/0060462 | A1* | 3/2018 | Whitehead | G06F 9/5083 |
| 2018/0068040 | A1* | 3/2018 | Lewis | G06F 9/5061 |
| 2019/0377672 | A1 | 12/2019 | Ante et al. | |

OTHER PUBLICATIONS

U.S. Appl. No. 16/006,610, Final Office Action dated Apr. 15, 2019, 20 pgs.

U.S. Appl. No. 16/006,610, Non Final Office Action dated Nov. 1, 2018, 17 pgs.

U.S. Appl. No. 16/006,610, Notice of Allowance dated Nov. 14, 2019, 10 pgs.

U.S. Appl. No. 16/006,610, Response filed Feb. 1, 2019 to Non Final Office Action dated Nov. 1, 2018, 14 pgs.

U.S. Appl. No. 16/006,610, Response filed Jun. 17, 2019 to Final Office Action dated Apr. 15, 2019, 17 pgs.

Canadian Application Serial No. 3,009,230, Office Action dated Jun. 5, 2019, 5 pgs.

Canadian Application Serial No. 3,009,230, Response filed Dec. 5, 2019 to Office Action dated Jun. 5, 2019, 16 pgs.

Korean Application Serial No. 10-2018-0072069, Notice of Preliminary Rejection dated Sep. 10, 2019, w/ English Translation, 4 pgs.

Korean Application Serial No. 10-2018-0072069, Response filed Nov. 11, 2019 to Notice of Preliminary Rejection dated Sep. 10, 2019, w/ English Claims, 20 pgs.

Canadian Application Serial No. 3,009,230, Office Action dated May 12, 2020, 4 pgs.

Canadian Application Serial No. 3,009,230, Response filed Sep. 11, 2020 to Office Action dated May 12, 2020, 14 pgs.

Korean Application Serial No. 10-2020-0071667, Notice of Preliminary Rejection date Sep. 3, 2020, w/ English translation, 4 pgs.

Korean Application Serial No. 10-2020-0071667, Response filed Nov. 3, 2020 to Notice of Preliminary Rejection dated Sep. 3, 2020, w/ English Claims, 22 pgs.

\* cited by examiner

METHOD AND SYSTEM FOR IMPROVED PERFORMANCE OF A VIDEO GAME ENGINE

CROSS-REFERENCE TO RELATED APPLICATIONS

This application is a continuation of and claims the benefit of priority under 35 U.S.C. § 120 to U.S. patent application Ser. No. 16/006,610, filed on Jun. 12, 2018, which is incorporated by reference herein in its entirety.

TECHNICAL FIELD

The present disclosure relates to the field of software tools for improving the performance of a video game engine.

BACKGROUND OF THE INVENTION

Most modern video game development is done using object oriented programming (OOP), wherein programming objects are used for each element of a game. The programming objects that represent elements within a game are often called game objects or game entities and are referred to herein as game objects. A game object can represent almost anything in a game, including characters, guns, treasures, trees, backgrounds, effects, etc. A game object is typically defined as an instance of an OOP class structure that includes methods and variables for the game object. Within computer memory, an OOP object (e.g., an instance of a class) is a structure that includes data and pointers to data in other locations within memory. For example, a game character might belong to a class that has values for position, orientation, size, mesh, etc., and also have methods defining behavior for the character. The memory location that contains the character game object includes data and can include pointers to other memory locations which contain more data for the character game object.

Current object oriented programming is not optimized for performance due in part to the use of reference value objects that contain pointers to data rather than containing data directly. Existing game development technology often uses reference value structures to define objects within a game. This is based on the concept of an object within the object oriented programming framework and is used for simplicity of programming (e.g., since the behavior and attributes of a programming object align well with those of a game object). However, object oriented programming may be optimized on a conceptual level and for ease of programming, but it is not always optimized for performance with respect to video game play. The main reason for the lack of optimized performance is that OOP programming does not automatically provide the optimum use of memory. OOP objects often contain pointers to data while the data itself is scattered randomly over distant memory locations. The result is that game object data is often in random places within memory and often contains pointers (e.g., to data) in other random locations within memory. In order to access the data for one or more characters (e.g., to determine the character location in a scene), a game engine will often have to access several separate random memory locations. There is also no hard guarantee of the relative location of data within memory for two different game objects. Accessing random memory locations for all game objects in a video game scene which runs at 60 frames per second (fps) or more is inefficient, especially considering the large amount of game objects which are typically in play during any given video game frame. Having game object data scattered over memory creates an inefficiency due to memory access time (e.g., the time it takes a central processing unit (CPU) to access a memory location, which is typically hundreds of CPU cycles each time a memory location is accessed). All memory accessing takes time; however, having to access memory in random distant locations requires additional time because the advantages of hardware prefetching are negated. The additional time it takes to access the scattered data within memory lowers the performance of executed game code at runtime. This puts limitations, for a given CPU speed, on the number of game objects that can be active in a frame during game play if a frame rate is to be maintained (e.g., 60 frames per second for typical games). This is particularly important for virtual reality applications which require 90 frames per second for minimum quality visual output. Modern game design improves performance by incorporating graphical processing units (GPUs) to offload processing from the CPU, as well as multithreaded coding techniques to parallelize the processing of game data over multiple CPU/GPU cores. However, these techniques do not overcome the fundamental issue of accessing separate random memory locations for game objects.

Game performance can also be improved by considering data oriented programming methodology as opposed to object oriented programming methodology, however, data oriented programming requires a high degree of knowledge for a game developer, and is done manually, and is specifically targeted to each game. This is out of reach for a large portion of game developers and game designers who have only a basic knowledge of programming methodology.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
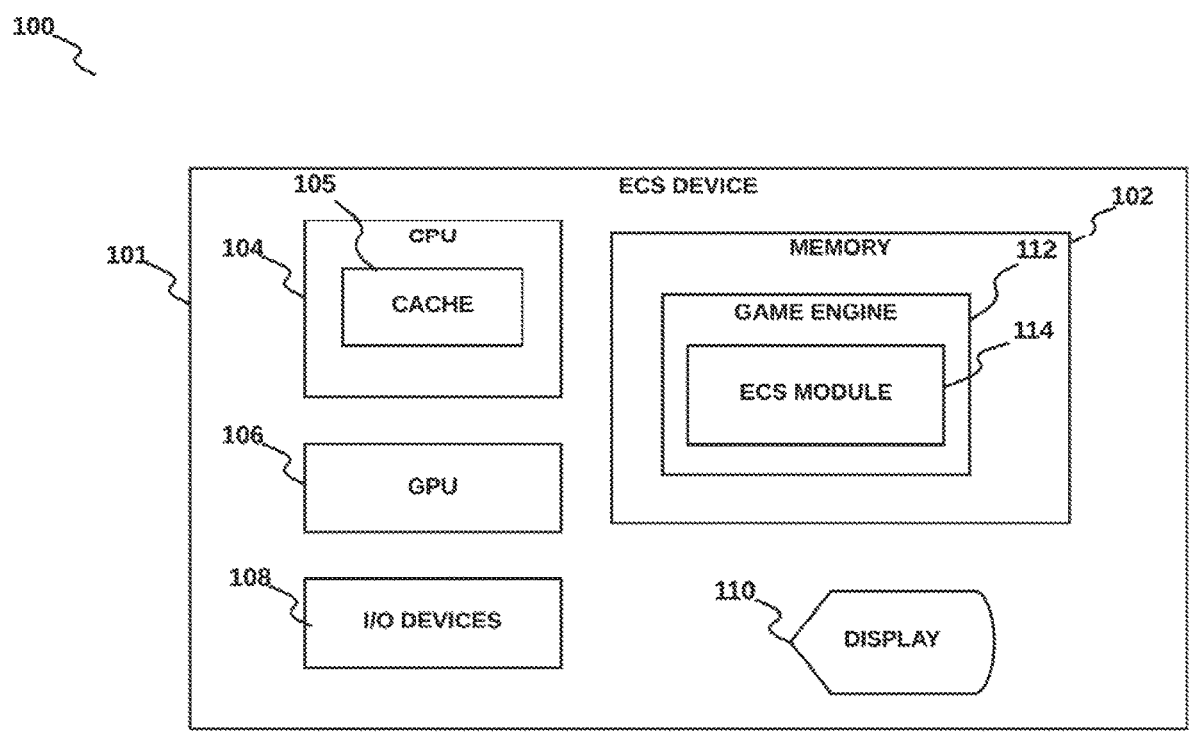
FIG. 1 is a schematic illustrating an entity component system (ECS) device in an ECS system, in accordance with one embodiment.

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Current object-oriented programming is not optimized for performance due in part to the use of reference value objects that contain pointers to data rather than containing data directly. Existing game development technology often uses reference value structures to define objects within a game. This is based on the concept of an object within the object-oriented programming framework and is used for simplicity of programming (e.g., since the behavior and attributes of a programming object align well with those of a game object). However, object oriented programming may be optimized on a conceptual level and for ease of programming, but it is not always optimized for performance with respect to video game play. The main reason for the lack of optimized performance is that OOP programming does not automatically provide the optimum use of memory. OOP objects often contain pointers to data while the data itself is scattered randomly over distant memory locations. The result is that game object data is often in random places within memory and often contains pointers (e.g., to data) in other random locations within memory. In order to access the data for one or more characters (e.g., to determine the character location in a scene), a game engine will often have to access several separate random memory locations. There is also no hard guarantee of the relative location of data within memory for two different game objects. Accessing random memory locations for all game objects in a video game scene which runs at 60 frames per second (fps) or more is inefficient, especially considering the large amount of game objects which are typically in play during any given video game frame. Having game object data scattered over memory creates an inefficiency due to memory access time (e.g., the time it takes a central processing unit (CPU) to access a memory location, which is typically hundreds of CPU cycles each time a memory location is accessed). All memory accessing takes time; however, having to access memory in random distant locations requires additional time because the advantages of hardware prefetching are negated. The additional time it takes to access the scattered data within memory lowers the performance of executed game code at runtime. This puts limitations, for a given CPU speed, on the number of game objects that can be active in a frame during game play if a frame rate is to be maintained (e.g., 60 frames per second for typical games). This is particularly important for virtual reality applications which require 90 frames per second for minimum quality visual output. Modern game design improves performance by incorporating graphical processing units (GPUs) to offload processing from the CPU, as well as multithreaded coding techniques to parallelize the processing of game data over multiple CPU/GPU cores. However, these techniques do not overcome the fundamental issue of accessing separate random memory locations for game objects.

Game performance can also be improved by considering data oriented programming methodology as opposed to object oriented programming methodology, however, data oriented programming requires a high degree of knowledge for a game developer, and is done manually, and is specifically targeted to each game. This is out of reach for a large portion of game developers and game designers who have only a basic knowledge of programming methodology.

Methods and apparatuses to improve the performance of a video game engine using an Entity Component System (ECS) are described herein. In accordance with an embodiment, the ECS eliminates (e.g., during game development and at runtime) the use of OOP reference value structures (e.g., pointers) to define game objects. Instead, the ECS defines game objects with data value structures (e.g., a 'struct' from C #) which do not use pointers to store data. In this sense, a game object as described herein is not an 'object' as defined within object oriented programming framework; accordingly, a game object as described herein (e.g., within the ECS) is referred to as an 'entity'.

In accordance with an embodiment, the ECS creates and uses entities which are constructed entirely using value data types (e.g., structs in C # which do not use pointers). An entity is a collection of data that is used to represent anything in a video game, including characters, guns, treasures, trees, backgrounds, animation, effects (e.g., video and sound), 3D points, and more. The ECS groups a plurality of entities into an archetype wherein the entities share similar attributes (e.g., components as described herein) and memory layout. The ECS constructs the entities (e.g., including the components therein) within a memory in a densely packed and linear way. The ECS constantly monitors (e.g., during game play) entities within a game and adjusts the entity distribution (e.g., including the data therein) within the memory so that a maximum density of memory usage is maintained in real time as the game is being played thus allowing for high performance due to efficient memory access (e.g., using hardware prefetching) and multithreading. The ECS system provides high performance for game situations that include a large number (e.g., hundreds or thousands) of similar game objects (e.g., non-player characters, rockets, spaceships, etc.).

Turning now to the drawings, systems and methods for an Entity Component System (ECS) which is configured to provide high processing performance for a video game engine (e.g., to display video games or simulations) in accordance with embodiments of the invention are illustrated. In accordance with an embodiment, FIG. 1 shows an example entity component system 100 configured to provide ECS functionality. The ECS includes an ECS device 101 which includes one or more central processing units 104 (CPUs), and graphics processing units 106 (GPUs). The CPU 104 is any type of processor, processor assembly comprising multiple processing elements (not shown), having access to a memory 102 to retrieve instructions stored thereon, and execute such instructions. Upon execution of such instructions, the instructions cause the ECS device 101 to perform a series of tasks as described herein. The CPU can include a cache memory 105 within the CPU.

The ECS device 101 also includes one or more input devices 108 such as, for example, a keyboard or keypad, mouse, pointing device, and touchscreen. The ECS device 101 further includes one or more display devices 110, such as a computer monitor, a touchscreen, and a head mounted display (HMD), which may be configured to display a video game environment or virtual simulation environment to the user. The display device 110 is driven or controlled by the one or more GPUs 106 and optionally the CPU 104. The GPU 106 processes aspects of graphical output that assists in speeding up rendering of output through the display device 110.

The ECS device 101 also includes a memory 102 configured to store a game engine 112 (e.g., executed by the CPU 104 or GPU 106) that communicates with the display device 110 and also with other hardware such as the input device(s) 108 to present a game (e.g., video game) or simulation to a user (not shown in the Figure). The game engine 112 would typically include a physics engine, collision detection, rendering, networking, sound, animation, and the like in order to provide the user with a video game (or simulation) environment. The game engine 112 includes an ECS module 114 that provides various entity component system functionality as described herein. Each of the ECS module 114, and game engine 112 include computer-executable instructions residing in the memory 102 that are executed by the CPU 104 and optionally with the GPU 106 during operation. The ECS module 114 may be integrated directly within the game engine 112, or may be implemented as an external piece of software (e.g., a plugin).

In accordance with an embodiment, the ECS module 114, executing on the ECS device 101, may be configured to create and manipulate an entity, which includes data, and which is a representation of a game object within a scene of a video game (or simulation). The entity can represent any game object (e.g., any virtual object within a game or simulation) including characters, props, scenery and effects. The entity includes data (e.g., entity data) that describes all aspects, properties and behaviors of the game object which it represents over time. The data includes data describing the visual aspects (texture, color, size, shape, orientation and like) of the game object; and the data includes data describing the behavior for the game object (e.g., movement of the object and the physics of interaction with other objects in the environment). The behavior of an entity is defined by the processes (e.g., functions) that modifies data of an entity.

In accordance with an embodiment, the entity data includes one or more small groups of data referred to herein as component data. In accordance with an embodiment, during execution (e.g., at runtime during game play) the ECS module 114 creates a component for an entity within a data value array structure (e.g., a 'struct' from within the C #programming language), wherein the elements within the array are laid out in contiguous memory blocks within the memory 102. A component does not contain a pointer to data in other distant locations within a memory 102. A component includes data that is associated with a logical grouping of data and behaviors which are used for adding functionality to a single entity. A component can add any type of functionality to an entity, including visual attributes and interaction with other components (e.g., within the same entity or within a different entity). The combination of components within an entity, and the data within the components, contribute to the properties and functionality of the entity in the game world during game play. For example, there can be a camera component which gives an entity the properties of a camera. There can be a light component which gives an entity the properties of a light. For example, a component could define the position, rotation and scale of an entity within a game world. For simplicity of explanation, we will refer to the component that defines the position, rotation and scale of an entity as the transform component since modifying the transform component of an entity would move, rotate or scale the entity (i.e., transform it) within the game world. As another example of a component, a component referred to herein as a rigid body component could enable physical behavior for an entity by allowing the entity to be affected by gravity within the game world. Still another example of a component could be a component, referred to herein as a collider component, that defines the shape of an entity for the purposes of a physical collision with one or more other entities.

In a typical game or simulation, a plurality of entities will have some overlap in the type of components they contain (e.g., two or more entities will have one or more components of the same type). For example, consider a game that includes five entities within a scene and wherein each entity has a transform component (e.g., with the transform data being independent for each entity). In accordance with an embodiment, when two or more entities contain the exact same number and type of components, the entities are referred to herein as an archetype. All entities with the same archetype have the same number and type of components and therefore share similarities with respect to the area which they occupy in memory 102. However, even though all entities with the same archetype have the same number and type of components, the specific component data for an entity is independent (and usually different) from the other entities. In accordance with an embodiment, the ECS module 114 groups (e.g., places) a plurality of entities of an archetype (e.g., all the entities of the archetype) contiguously together in memory 102 (e.g., as described with respect to FIG. 2A, 2B, 3 and with respect to the methods described in FIGS. 4A, 4B and 4C). A location in memory 102 where the plurality of entities of a single archetype are grouped together is referred to herein as a chunk. A chunk is a contiguous block (e.g., a section or area) within memory 102 containing entities sharing the same archetype. In accordance with some embodiments, a single archetype is contained within a single chunk. In accordance with other embodiments, a single archetype can be divided into two or more chunks if a single chunk is not large enough to contain the archetype. In accordance with an embodiment a chunk has a fixed size in memory (e.g., 16 kilobytes or 64 kilobytes)

Figure 2A:
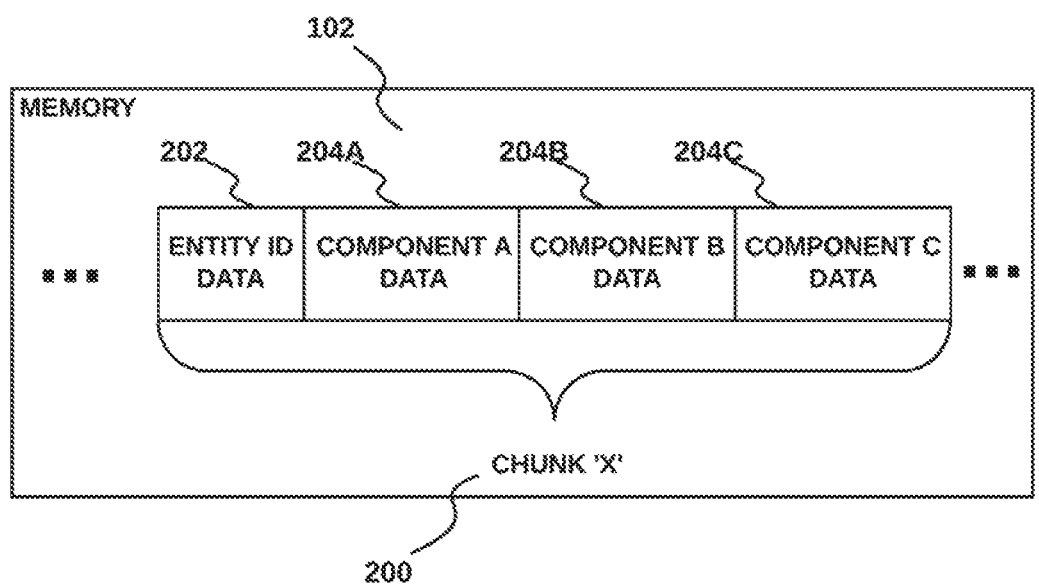
FIG. 2A is a schematic illustrating a memory layout for a chunk in an ECS system, in accordance with one embodiment.

In accordance with an embodiment, and shown in FIG. 2A, is a schematic diagram of a data layout for a chunk 200 in memory 102. Data within a chunk 200 is divided (e.g., by the ECS module 114) into a plurality of sections, wherein a section contains the data for a single type of component (e.g., a transform component) for all entities in the archetype associated with the chunk 200. In some embodiments the data within a section is created by the ECS module 114 within a data value structure such as an array. Throughout the description herein, an array which contains all data within a section (e.g., for a component type) is referred to as a component data array. In accordance with an embodiment, and shown in FIG. 2A, the plurality of different component data arrays within a chunk 200 are placed by the ECS contiguously in memory 102 so that all the component data is laid out linearly and compact (e.g., contiguously) within memory 102. FIG. 2A shows an example wherein a chunk 200 contains an archetype that has a plurality of entities (e.g., 5 entities) that all contain three components: a first component (component 'A'), a second component (component 'B'), and a third component (component 'C'). The data for component A is placed by the ECS module 114 in a first data array in a first section 204A. The data for component B is in a second data array in a second section 204B. The data for component C is placed by the ECS module 114 in a third data array in a third section 204C. Within the memory chunk 200 associated with the archetype, all the component A data (e.g., the component A data for all entities within the archetype) is placed by the ECS module 114 contiguously within the component A data array 204A, followed by all the component B data (e.g., the component B data for all entities within the archetype) placed by the ECS module 114 contiguously within the component B data array 204B, followed by all the component C data (e.g., the component C data for all entities within the archetype) placed by the ECS module 114 contiguously within the component C data array 204C.

In accordance with an embodiment, and also shown in FIG. 2A, a chunk 200 can also include Entity ID data (e.g., in an Entity ID data array 202). The entity ID data includes information that describes the specific entities included in the chunk 200. In some embodiments, the entity ID 202 includes specific location information (e.g., array element numbers) for each entity within each component data array. For example, the entity ID 202 would include information that links a specific location within a component data array (e.g., element array number 12) to a specific entity (e.g., entity 123 which represents a specific game character object). In accordance with an embodiment, all component data arrays within the same chunk have the same order of entity data so that, for example, element array number 12 in all component data arrays (e.g., component A, component B and component C) is linked to entity 123.

Figure 2B:
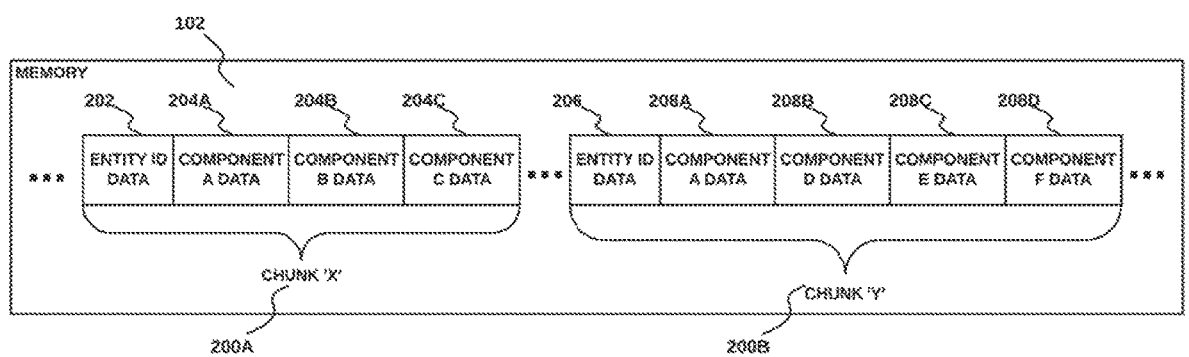
FIG. 2B is a schematic illustrating a memory layout within two chunks in an ECS system, in accordance with one embodiment.

In accordance with an embodiment, and shown in FIG. 2B, is a schematic diagram of a data layout for a first chunk 200A (e.g., labeled chunk 'X') and a second chunk 200B (e.g., labeled chunk 'Y'). The first chunk 200A is similar to the chunk 200 in FIG. 2A. The second chunk 200B includes data for a second archetype that includes 4 components: a first component (component 'A') in a first data array in a first section 208A, a second component (component 'D') in a second data array in a second section 208B, a third component (component 'E') in a third data array in a third section 208C, and a fourth component (component 'F') in a fourth data array in a fourth section 208D. Note that the two different archetypes (e.g., the first archetype in the first chunk 200A and the second archetype in the second chunk 200B) can have one or more (but not all) similar component types (e.g., component 'A' 204A and component 'A' 208A may both be the same type of component, such as a transform component). Despite the component type for component 'A' 204A in chunk 'X' 200A being similar to the component type for component 'A' 208A in chunk 'Y' 200B, the data within the two sections are not the same since the two sections each represent a different set of entities.

Figure 3:
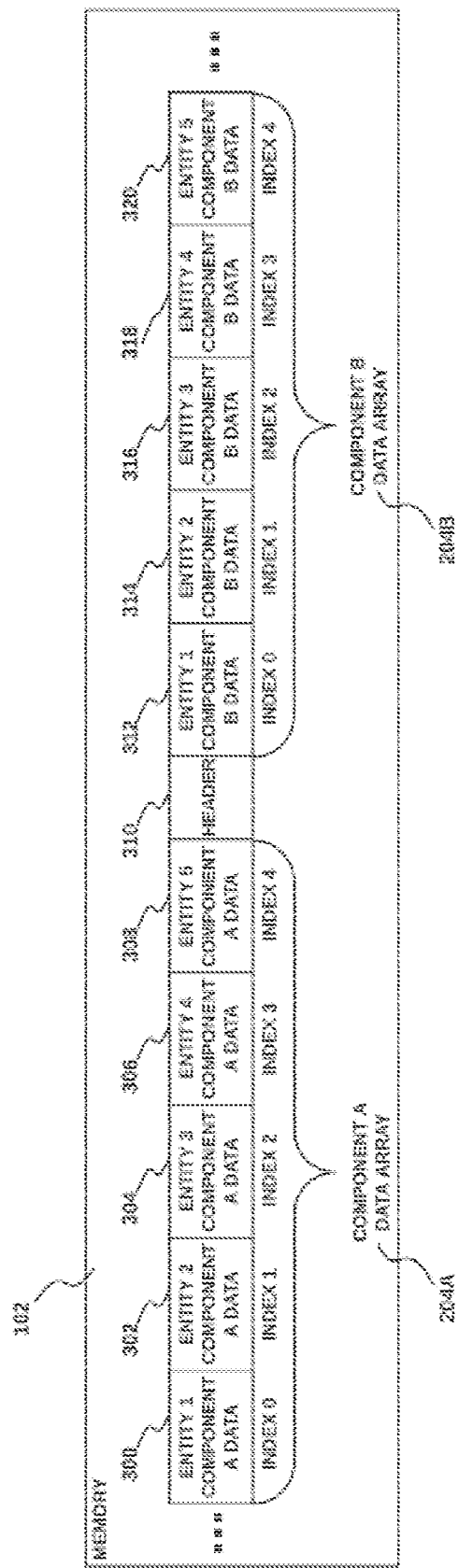
FIG. 3 is a schematic illustrating a memory layout for a component data array within a chunk in an ECS system, in accordance with one embodiment.

In accordance with an embodiment, and shown in FIG. 3, is a schematic diagram of a memory layout for a component data array in memory 102. FIG. 3 shows some internal data structure for two component data arrays described in FIGS. 2A and 2B within chunk 'X' 200A. The first component data array 204A includes component 'A' data, and the second component data array 204B includes component 'B' data. As shown in FIG. 3, the first component data array 204A contains data from only one type of game component (e.g., only component A, such as a transform component), and wherein each element of the array 204A includes data belonging to a different specific entity. In the example shown in the figure, there are 5 entities within the archetype and the first component data array 204A contains all the data within the archetype for component 'A' placed contiguously in memory 102. More specifically, five sections that include component 'A' data for Entity 1, Entity 2, Entity 3, Entity 4 and Entity 5 are in a first section 300, a second section 302, a third section 304, a fourth section 306 and a fifth section 308 respectively, and whereby the five sections are next to (e.g., contiguous) each other in memory 102. In the example shown in FIG. 3, the second component data array 204B contains all the data within the archetype for component 'B' placed contiguously in memory 102. More specifically, five sections that include component 'B' data for Entity 1, Entity 2, Entity 3, Entity 4 and Entity 5 are in a first section 312, a second section 314, a third section 316, a fourth section 318 and a fifth section 320 respectively, and whereby the five sections are next to (e.g., contiguous with) each other in memory 102. In accordance with an embodiment, and shown in FIG. 3 as a header 310, a component data array (e.g., component 'B' data array 204B) may contain one or more sections that precede the component data and that contain header data or metadata for the component data array.

In accordance with an embodiment, the location within a component data array (e.g., array index) of data for one entity is consistent across all component data arrays within a chunk. For example, as shown in FIG. 3, a first entity (e.g., Entity 1) can have component 'A' data in a first section 300 of the first component data array 204A at a first array index number (e.g., array index 0); and similarly, the first entity has component 'B' data in a first section 312 of the second component data array 204B with the same array index number (e.g., array index 0); and similarly (e.g., not shown in FIG. 3), the first entity has component 'C' data in a first section of the third component data array 204C with the same array index number (e.g., array index 0). In this way, the location of an entity within a component data array (e.g., array index number) is consistent across different component data arrays within a chunk. For example, in the example from FIG. 3, the component data array index of '0' refers to the first entity (e.g., Entity 1) for all the component data arrays within the chunk (e.g., for the first component data array 204A, the second component data array 204B, the third component data array 204C, and so on). Similarly, the component data array index of '1' refers to the second entity (e.g., Entity 2) for all the component data arrays within the chunk 200A, and the component data array index of '2' refers to the third entity (e.g., Entity 3) for all the component data arrays within the chunk, and so on for all the entities within the chunk 200A.

As described above, a component data array element is linked with a specific component and a specific entity. For example, in FIG. 3, the component data array element in the first section 300 of the first component data array 204A at the first array index number (index 0) refers to the data for component 'A' of Entity 1. The section 300 with data for component 'A' of Entity 1 can include another array that includes specific data for the component. For example, consider that component 'A' is a transform component that requires at least 9 values (e.g., 3 values for size, 3 values for position and 3 values for orientation), and therefore the first section 300 (e.g., and all the other sections 302, 304, 306 and 308) of the first component data array 204A for the chunk 200A stores an array of at least 9 elements.

By creating and structuring component data arrays as shown in FIG. 2A, FIG. 2B and FIG. 3, the ECS module 114 can quickly iterate over elements within a single component type (e.g., in order to change values therein) for all similar entities in a game (e.g., because similar entities are in the same archetype and also within the same chunk within memory 102). The quick iteration over component data in a chunk is due to the guarantee of a linear and compact (e.g., contiguous) layout of data within memory 102 of the component data as described herein with respect to FIG. 2A, FIG. 2B and FIG. 3. The contiguous linear layout of entity data as shown in FIG. 3 and the contiguous linear layout of component data arrays as shown in FIGS. 2A and 2B ensures linear iteration over all the entities within a chunk, thus allowing maximum use of hardware prefetching. Hardware prefetching is a technique used in a CPU to bring data from a slow access memory location (e.g., main memory 102) to a fast access local cache memory within the CPU (e.g., cache memory 105 shown in FIG. 1) before the data is needed by the CPU. The contiguous, compact linear layout of entity and component data shown in FIG. 2A, FIG. 2B and FIG. 3 maximizes the effectiveness of hardware prefetching techniques.

As an example of archetypes and archetype structure in memory 102, consider a game scene (e.g., in a video game environment) containing 5 'cube' entities (e.g., 5 game objects which are cubes). In the example, the 5 entities are grouped into 2 archetypes and occupy 2 chunks in memory 102 (e.g., one chunk for each of the two archetypes). Specifically, as part of the example, the 5 entities are divided into Archetype I and Archetype II. As part of the example, Archetype I contains 3 cube entities with labels such as 'Cube 1', 'Cube 2' and 'Cube 3'. All entities in Archetype I (e.g., the three cube entities 'Cube 1', 'Cube 2' and 'Cube 3') contain 6 components, including for example: a transform component (e.g., describing the size, orientation and position of the entity), a cube component (e.g., describing the shape of the entity), a box collider component (e.g., defining the collision volume associated with the entity), a mesh renderer (e.g., describing rendering information for a mesh for the entity), a light component (e.g., describing light generation properties of the entity), and an Audio Source component (e.g., describing an audio source associated with the entity). Accordingly the chunk for Archetype I has 6 component data arrays including one array for each of the 6 components. Furthermore, continuing with the example, Archetype II contains 2 cube entities (e.g., labeled as 'Cube 4' and 'Cube 5') wherein the two cube entities (all the entities within the archetype) contain 4 components, including: a transform component, a cube component, a box collider component, and a mesh renderer component. Even though there are 5 cubes in the example, the 5 cubes are not similar enough to be in a single archetype since 3 of the cubes ('cube 1', 'cube 2', and 'cube 3') contain one set of components while 2 of the cubes ('cube 4', and 'cube 5') contain a different set of components. Instead, the 5 cubes are grouped into two different archetypes (e.g., Archetype I and Archetype II) which each have a unique set of component data arrays.

The method of packing the memory 102 within chunks as shown in FIG. 2A, FIG. 2B and FIG. 3 allows the ECS module 114 to access data for individual components very efficiently. Accessing data for a first component is independent of accessing data for a second component. For example, accessing one type of game component data (e.g., transform data) for one or more entities within an archetype does not involve loading (e.g., from memory 102 into the cache 105) all the other game component data for the same one or more entities. As a specific example, consider Archetype 1 as described above. For archetype 1, changing transform component data for the entities within the archetype does not involve loading (e.g., from memory 102 to the cache 105) any of the other component data; namely, cube component data, box collider component data, mesh renderer component data, light component data, and Audio Source component data.

Figure 4A:
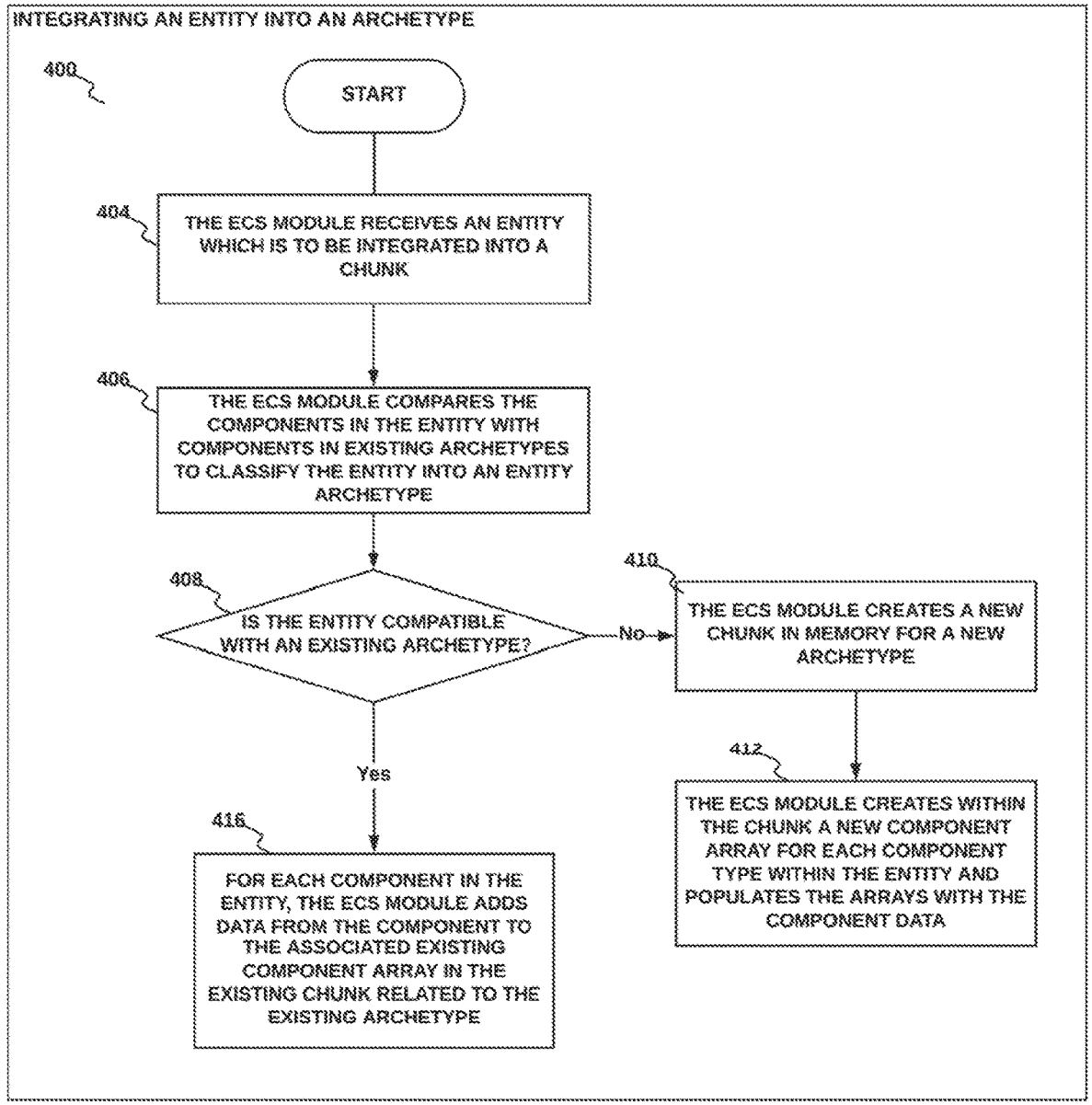
FIG. 4A is a schematic illustrating a method for integrating an entity into an archetype within an ECS system, in accordance with one embodiment.

In accordance with an embodiment and shown in FIG. 4A is a flowchart of a computer-implemented method 400 for integrating an entity (e.g., a new entity or a modified entity) into an ECS system that includes existing chunks (and associated archetypes). The computer-implemented method 400 (hereafter referred to as "the method 400") is performed by a computing device (e.g., such as the ECS device 101) including at least one hardware processor and a memory 102. During operation (e.g., during game play), an event in a game may require the creation of a new entity (or modification of an existing entity) which might require the method 400 for integrating an entity. The method starts at process 404 when the ECS module 114 receives an entity which is to be integrated into a chunk (the details of the receiving described herein with respect to FIG. 4B and FIG. 4C). At process 406, the ECS module 114 compares the components within the received entity with components in existing archetype chunks (e.g., existing in memory 102) to attempt to classify the received entity into one of the existing archetypes. At process 408 a decision is made, based on the comparison of process 406, as to whether the received entity is compatible with and classified into an existing archetype (e.g., has the same number and type of components as the entities within the existing archetype) or if the received entity is not classified into an existing archetype. If the received entity is classified into an existing archetype, then at process 416, based on the received entity being classified into the existing archetype, for each component in the received entity, the ECS module 114 adds the data from the component to an associated component data array of the same type (e.g., add component 'A' data from the received entity to the end of the component 'A' data array) in the classified existing chunk (e.g., the chunk related to the classified existing archetype). At process 410, based on the received entity not being classified into an existing archetype, the ECS module 114 creates a new chunk (for a new archetype) in memory 102 using the components from the received entity. At process 412, the ECS module 114 creates within the new chunk one new component data array for each component type within the received entity. The ECS module 114 populates the created arrays with the associated component data from the received entity.

Figure 4B:
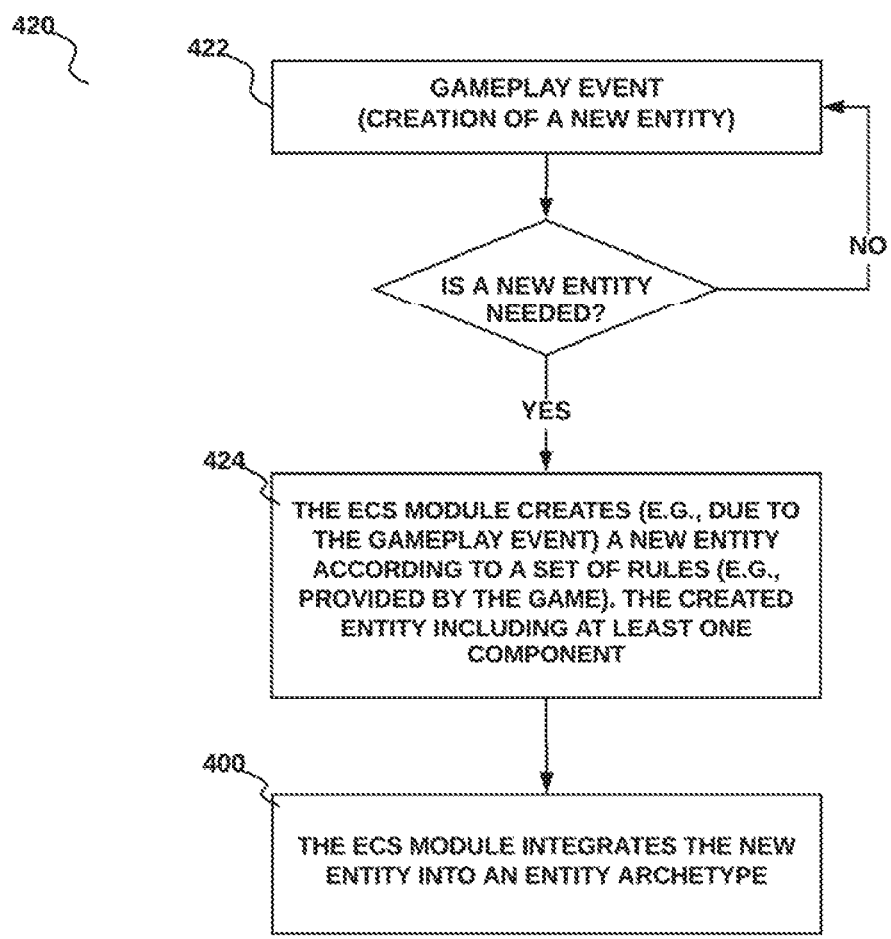
FIG. 4B is a schematic illustrating a method for creating an entity within an archetype within an ECS system, in accordance with one embodiment.

In accordance with an embodiment and shown in FIG. 4B is a flowchart for a computer-implemented method 420 for creating a new entity. The computer-implemented method 420 (hereafter referred to as "the method 420") is performed by a computing device (e.g., such as the ECS device 101) including at least one hardware processor and a memory 102. During operation (e.g., during game play), at process 422, an event in a game requires the creation of a new entity (e.g., a spawning of a creature/character, firing of a weapon, movement of a character, and the like). At process 424, based on the gameplay event requiring the creation of a new entity, the ECS module 114 creates a new entity with at least one component. The created entity would typically include a plurality of components based on a set of rules (e.g., rules created by a game developer) for the creation of the entity based on the event. For example, the creation of a new entity for a game character would include components that included data for the character size, position, orientation, shape, texture, physics, and the like. The values within the components would be determined by the rules (e.g., including default values and values determined by the event in process 422 that initiated the creation of the entity). The ECS module 114 then uses the method 400 to integrate the new entity into an entity archetype.

Figure 4C:
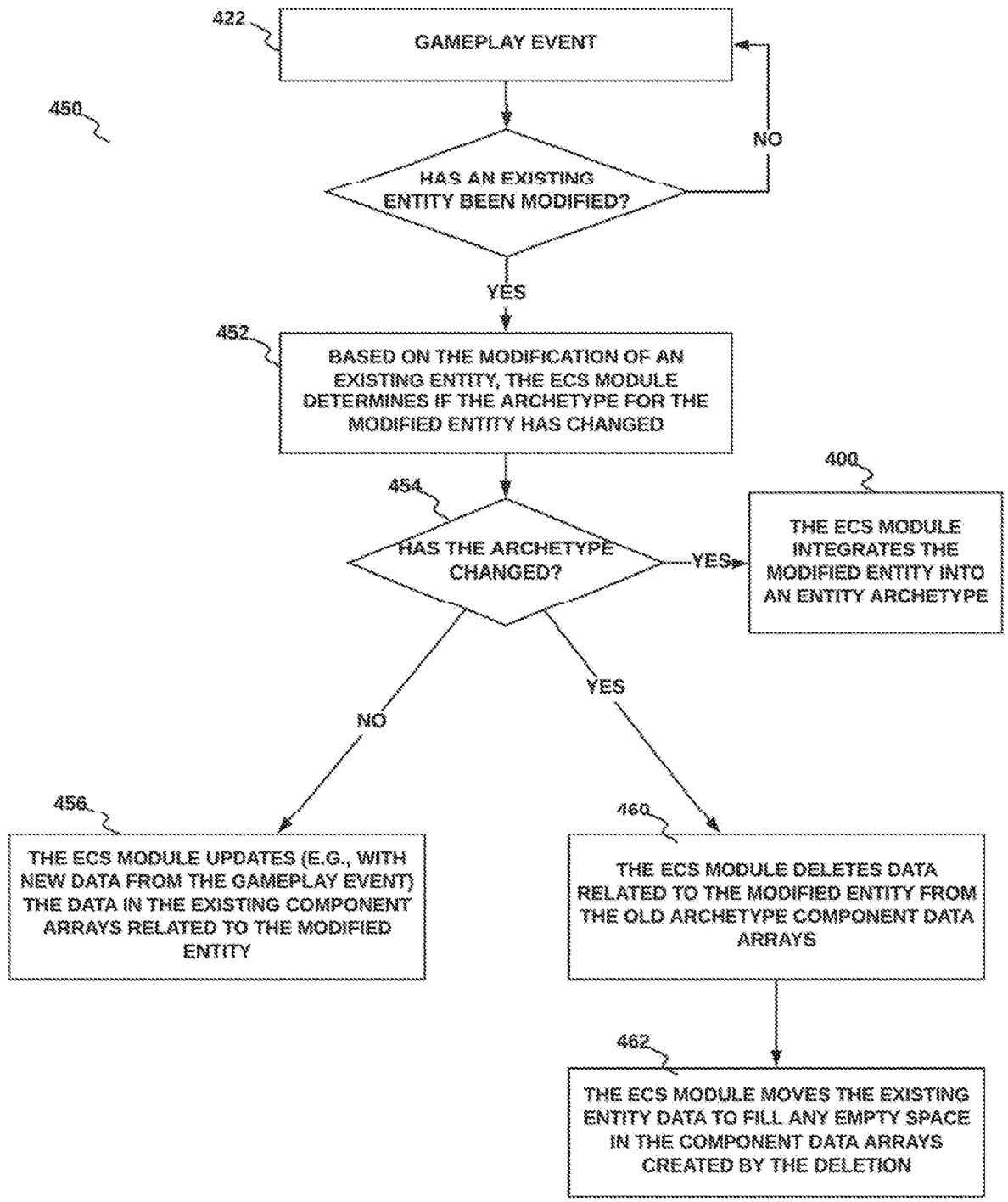
FIG. 4C is a schematic illustrating a method for modifying an entity within an ECS system, in accordance with one embodiment.

In accordance with an embodiment and shown in FIG. 4C is a flowchart for a method 450 for modifying an existing entity. The computer-implemented method 450 (hereafter referred to as "the method 450") is performed by a computing device (e.g., such as the ECS device 101) including at least one hardware processor and a memory 102. During operation (e.g., during game play), an event 422 in a game may require modification of an existing entity (e.g., if the component data or behaviors therein are modified via addition, deletion or modification such as when an object is moved and the transform component is modified). At process 452 and 454, the ECS module 114 determines if the archetype for the modified entity has changed due to the addition or deletion of a component type. At process 456, based on the archetype not changing, the ECS module 114 updates data in the existing component arrays related to the modified entity using new data from the gameplay event. To update the data, the ECS module 114 loads data from the memory 102 to the cache 105, modifies it, and then writes it back to the memory 102. At process 460, based on the archetype of the modified entity changing, the ECS module 114 deletes data related to the modified entity from the original archetype (e.g., the archetype for the entity before the modification) component data arrays. At process 462, the ECS module 114 moves the remaining entity data in the old archetype to fill any empty space in the component data arrays created by the deletion (e.g., as described with respect to FIGS. 6A, 6B and 6C). At process 400, based on the archetype of the modified entity changing, the ECS module 114 integrates the modified entity into an entity archetype.

In accordance with an embodiment, the behavior of an entity is determined by programming code (or system code) which accesses and modifies data within one or more components. The behavior of an entity in the ECS system is achieved by acting on component data using functions. The functions include iterating (e.g., using loops) over the elements of one or more component data arrays.

Figure 5:
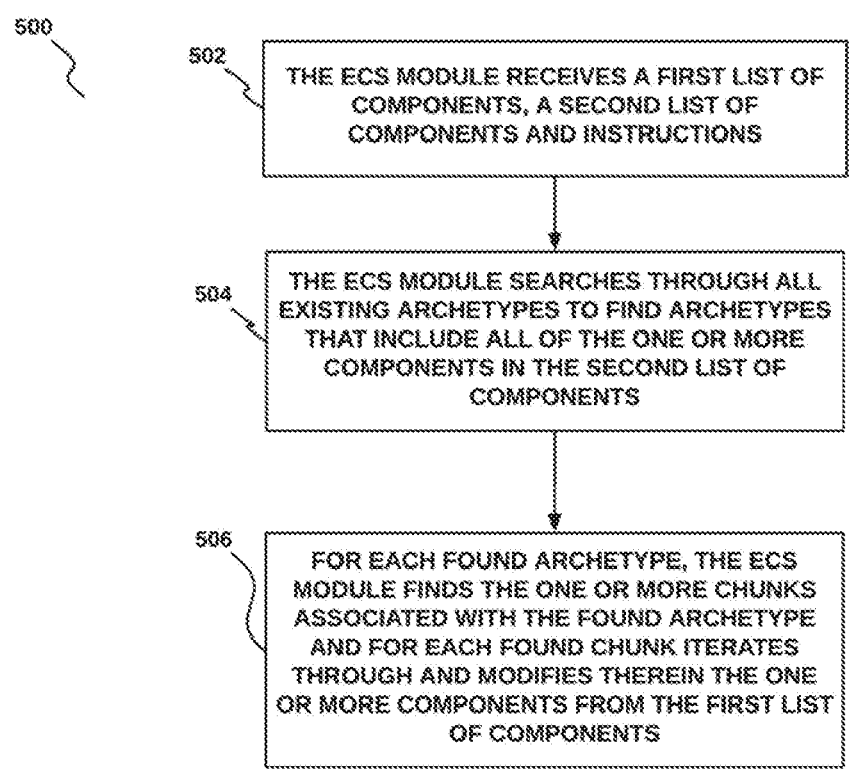
FIG. 5 is a schematic illustrating a method for modifying entity data within an ECS system, in accordance with one embodiment.

In accordance with an embodiment and shown in a flowchart in FIG. 5, is a computer-implemented method 500 wherein the ECS module 114 discovers a plurality of entities and iterates over components of the plurality of entities in order to modify or read the data within the components. The computer-implemented method 500 (hereafter referred to as "the method 500") is performed by a computing device (e.g., such as the ECS device 101) including at least one hardware processor and a memory 102. The method 500 begins when the ECS module 114 receives (e.g., from the user of a game via the game engine 112) instructions to modify or read the properties of a plurality of entities (e.g., by changing the data within the components for the entities). In accordance with an embodiment, at process 502, the ECS module 114 receives (e.g., from the game engine or from a user) a first list of components, a second list of components, and instructions. The first list of components including names (or labels) of one or more components (e.g., a transform component, a collider component, and the like) to modify according to the instructions. The instructions include details for changing the data within the one or more components on the first list of components (e.g., including using math formulas to change mathematical values, and selecting values from a list). The second list of components providing criteria for finding the plurality of entities to be modified. The second list including names (or labels) of one or more components which must be included in the plurality of entities to be found and modified. At process 504, the ECS module 114 searches through all: the archetypes in the game world environment (or simulation environment) to find a set of archetypes that have components that include all the one or more components in the second list of components. The search might include searching through the Entity ID data 202, 206 for a chunk. The archetypes in the set must each have at least all the components on the second list. At process 506, for each found archetype, the ECS module 114 finds the one or more chunks associated with the found archetype, and for each found chunk, iterates through and modifies the one or more components from the first list of components therein according to the instructions. A component is modified by the ECS module 114 by iterating through the elements of the component wherein each element to be modified is read from the memory 102 to the cache 105 where it is modified and then written back to the memory 102. In some embodiments, the modification of the components in each archetype in the process 506 are done in parallel whereby the modifications to a first archetype are independent of the modifications to a second archetype (e.g., the modifications to the first archetype are performed on a first CPU core and the modifications to the second archetype are performed on a second CPU core). In some embodiments, as part of process 506, the ECS module 114 creates a linked list of all the data for each component on the first list of components (e.g., one linked list for each component), wherein the linked list includes an array of data for each chunk. The data within the linked list is not moved within memory, rather the linked list provides a path through memory from one chunk to another in order to hide the fact that the data is split between a plurality of chunks.

As an example of the method shown in the flow chart in FIG. 5, consider a situation wherein the game engine directs the ECS module 114 to find all entities containing a first component (e.g., component A) and a second component (e.g., component B) in order to modify the first component. In the example, the first component list contains component A while the second component list contains component A and component B. Perhaps component A is a transform component, and component B is a collider component. In the example, consider a game environment (or simulation environment) that contains a plurality of entities within 4 archetypes. The first archetype (e.g., Archetype 1) contains all entities that only have a single component: component A. The second archetype (e.g., Archetype 2) contains all entities that contain two specific components: component A and component B. The third archetype (e.g., Archetype 3) contains all entities that contain three specific components: component A, component B, and component C. The fourth archetype (e.g., Archetype 4) contains all entities that contain three specific components: component D, component E and component F.

Archetype 1: [A]
Archetype 2: [A, B]
Archetype 3: [A, B, C]
Archetype 4: [D, E, F]

Continuing with the example, the game environment contains a plurality of entities within each of the four archetypes. For example, consider a situation where there are 5 entities in Archetype 1, 300 entities in Archetype 2, 2,000 entities in Archetype 3 and 10,000 entities within Archetype 4. As part of the example, consider that the 5 entities of Archetype 1 are in a first chunk, the 300 entities in Archetype 2 are in a second chunk, the 2,000 entities of Archetype 3 are split between a third chunk and a fourth chunk, and the 10,000 entities in Archetype 4 are split between another 5 chunks. In the example, the ECS module 114 is directed by the game engine to iterate over-component A (e.g., the transform component). In the example, the ECS module 114 would do the following:

1) The ECS module 114 searches over all archetypes to find the specific archetypes that include both component A and component B (e.g., all the components from the second list of components). In the example, there are 2 archetypes that include both component A and component B: Archetype 2 and Archetype 3 (e.g., Archetype 1 is not compatible since it is missing component B, and Archetype 4 is not compatible since it is missing both component A and component B).

2) For each found archetype (e.g., Archetype 2 and Archetype 3), the ECS module 114 finds the one or more chunks associated with the archetype. In the example, the ECS module 114 would have 3 chunks over which to iterate: the second chunk associated with Archetype 11 and the third chunk and the fourth chunk associated with Archetype III.

3) Within each found chunk the ECS module 114 sequentially modifies the data within component A for all entities from one end of the chunk to the other based on the instructions received (e.g., each entity can be modified differently). A component is modified by the ECS module 114 by iterating through the elements of the component, wherein each element to be modified is read from the memory 102 to the cache 105 where it is modified and then written back to the memory 102. In the example, the ECS module 114 might first iterate over the chunk associated with Archetype 2 and modify component A for the 300 entities therein according to the specifics of the modification instructions. Simultaneously or sequentially, the ECS module 114 modifies the third chunk and fourth chunk associated with Archetype 3 by sequentially modifying component A for the 2,000 entities in Archetype 3 from one end of a chunk to the other. The modification is very fast since the data within the entities is linearly and compactly (e.g., contiguously) packed within each chunk (e.g., similar to what is shown in FIG. 3) which allows hardware prefetching use to be maximized.

The contiguous packing of memory by the ECS is useful when dealing with a large group of similar entities (e.g., an archetype), since the game/user will often want to access the same type of data (e.g., the same component) in bulk across all the entities in the archetype. For example, assume in the example above that the 2,000 entities in Archetype 3 represent non-player characters (NPCs) and the game/user wants to change the position data of all of them (e.g., due to a nearby explosion). The ECS module 114 can quickly change the position data (e.g., which is part of the transform component) for all 2,000 NPC entities because the data is in one long contiguous block of memory (e.g., as shown and described for FIG. 3).

Deletion of an Entity

Figure 6A:
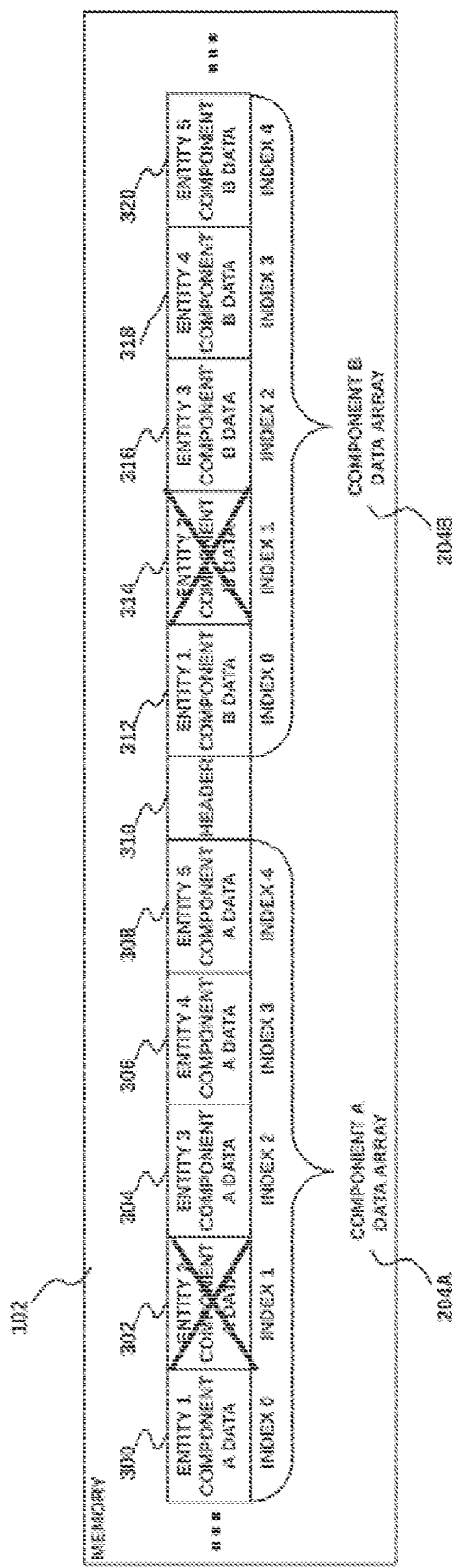
FIGS. 6A, 6B and 6C illustrate a method for deleting an entity within an ECS system, in accordance with one embodiment.
Figure 6B:
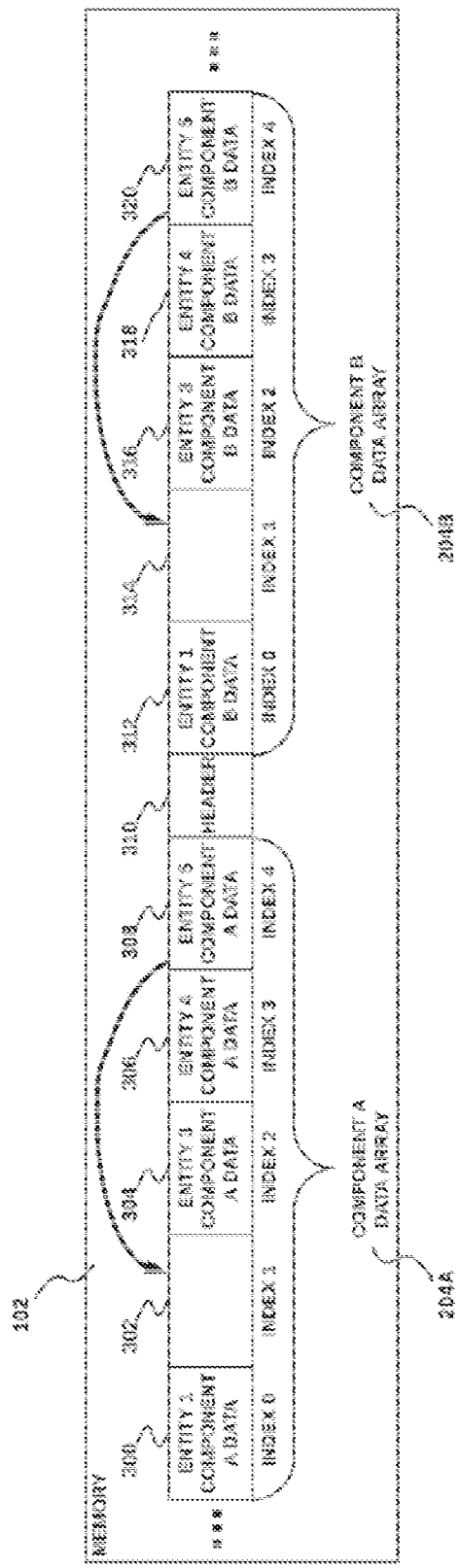
Figure 6C:
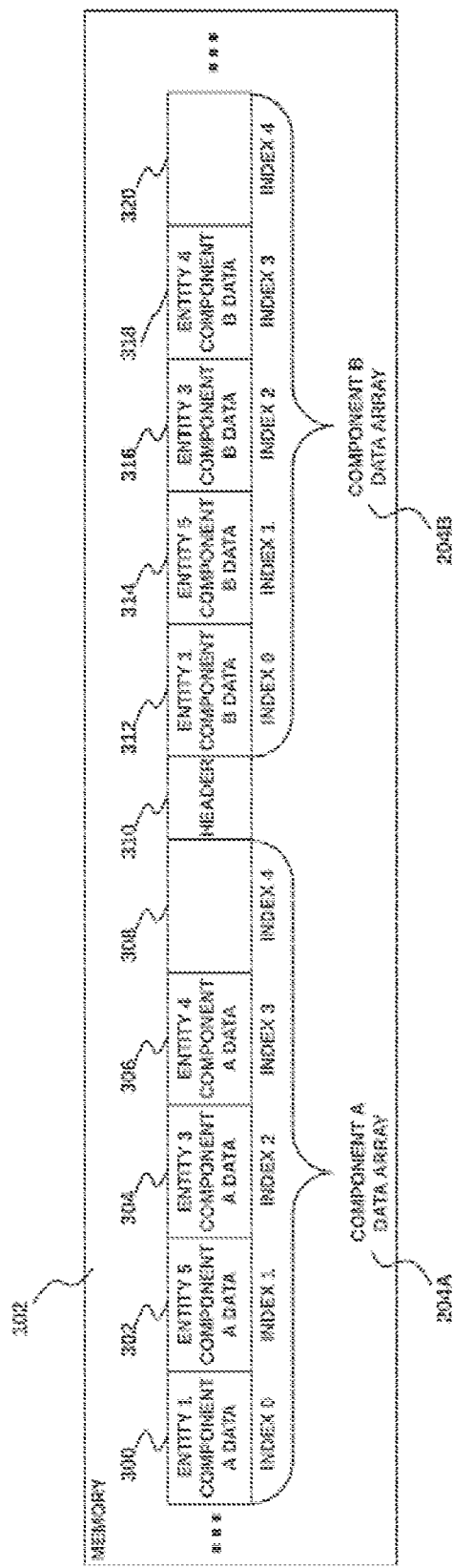

In accordance with an embodiment, the ECS module 114 works to keep all live entities within an archetype chunk packed tightly in memory (e.g., by removing gaps caused by a deleted entity) in order to maintain high efficiency when accessing memory 102. The ECS module 114 removes from a chunk, with high priority, entity data from an entity that has been deleted (e.g., if an entity such as a character or other object is blown up during a game and no longer exists). When an entity is deleted during game play (e.g., due to a gameplay event), the memory space within each component data array which was assigned to the deleted entity can be filled with component data from another similar live entity (e.g., another entity from the same archetype which is not deleted). An example of the deletion of an entity within the ECS is shown in FIGS. 6A and 6B. FIG. 6A shows two component data arrays similar to those described in FIG. 3, before the deletion of an entity, and FIG. 6B shows the same two component data arrays after deletion of the entity. In accordance with an embodiment and shown in the example, when entity data is deleted from within a component data array (e.g., the middle of the array), the ECS module 114 moves data associated with the last entity in the component data array (e.g., the entity at the end of the array) to the empty memory space created by the deleted entity data. The same movement of data is performed on all component data arrays in the archetype since the deleted entity has data in each of the arrays in the archetype (e.g., at the same index number for each of the component data arrays). For example, as shown in FIG. 6A, a gameplay event has caused Entity 2 to be deleted (e.g., removed) from the game. FIG. 6A shows that all data for Entity 2, including data in the component A data array 204A (at the section 302 for Index 1) and data in the component B data array 204B (at the section 314 for Index 1) is being deleted as shown in the figure by an 'X' over the respective sections. Other data for Entity 2 in other component data arrays (e.g., component C data array 204C) not shown in FIG. 6A and FIG. 6B would also be deleted. FIG. 1B shows the empty section 302 in memory 102 for the component A data array 204A and the empty section 314 in memory 102 for the component B data array 204B. In accordance with the example, the ECS module 114 would move data for the last entity in all the component data arrays for the chunk (e.g., the last position shown in the figure with Index 4) in order to fill the empty sections in memory caused by the deletion. Accordingly, the ECS module 114 would move data for Entity 5 from the last section 308 in the component A data array 204A (e.g., at Index 4) to the section 302 for Index 1 to replace the deleted entity data. Similarly, the ECS module 114 would move data for Entity 5 from the last section 320 in the component B data array 204B (e.g., at index 4) to the section 314 for Index 1 to replace the deleted entity data. The movement of data is shown symbolically in FIG. 6B with an two arrows from section 308 to section 302 and from section 320 to section 314. FIG. 6C shows both the component A data array 204A and the component B data array 204B after the data for Entity 5 is moved and wherein the data for Entity 5 has filed the gaps in memory caused by the deletion and the component data arrays (204A and 204B) have regained the compact, contiguous and linear memory density layout. In accordance with some embodiments, empty memory spaces at the end of a component data array (e.g., such as the section 308 for Index 4 at the end of the component A data array 204A and the section 320 for Index 4 at the end of the component B data array 204B) may be left empty by the ECS module 114 in order to save space for new entities which may be added to the archetype. The entity ID data can be modified to reflect the removal of the deleted entity data and the change in position of the moved entity data due to the deletion (e.g., including changing the number of entities in the chunk to be one less than before the deletion). Accordingly, there are no permanent memory holes within a component data array since the ECS module 114 actively keeps the memory within a component data array (and a chunk) packed tightly with live entities.

Figure 7A:
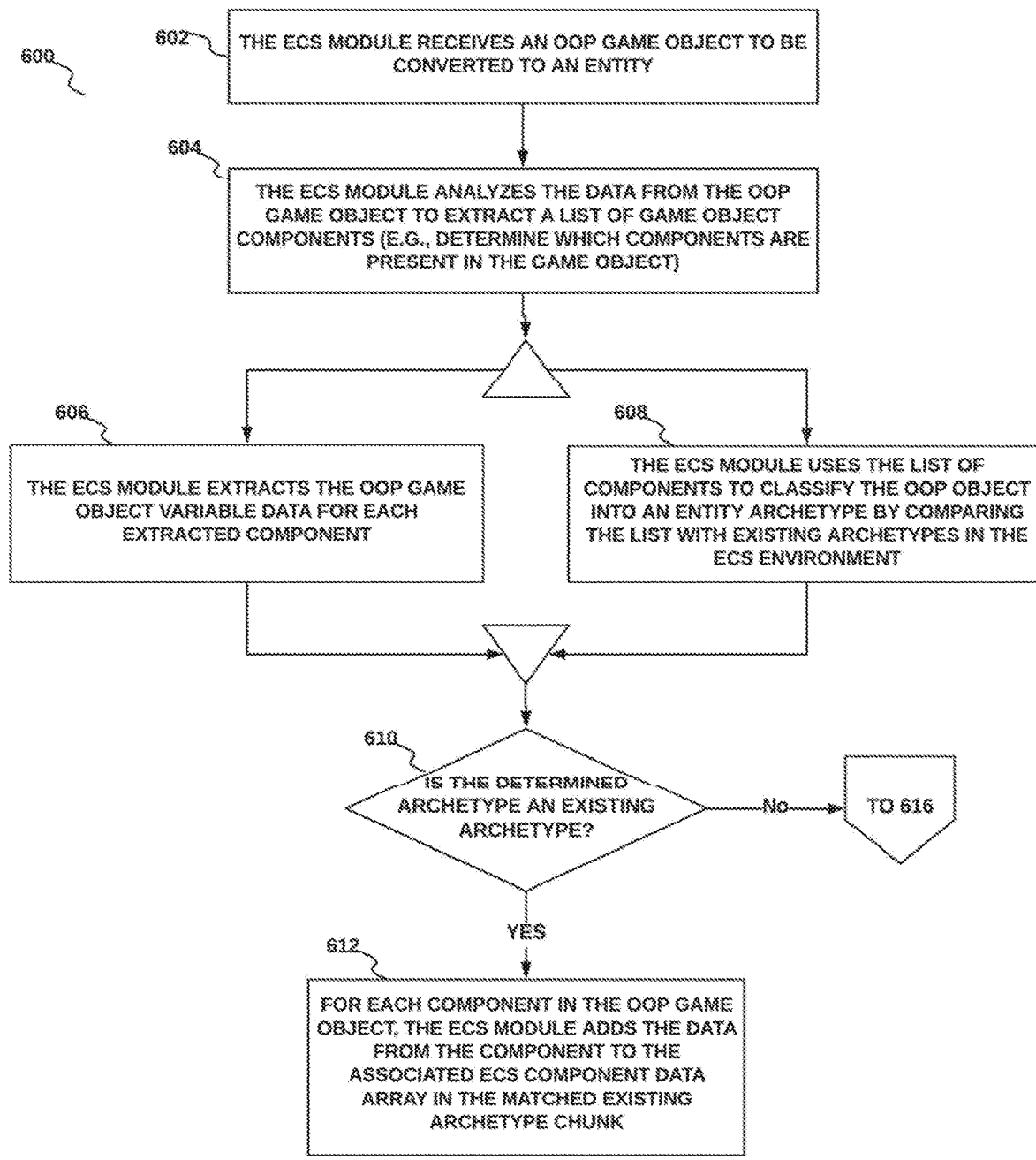
FIGS. 7A and 7B show a method for converting an object oriented programming object to an entity within an ECS system, in accordance with one embodiment.
Figure 7B:
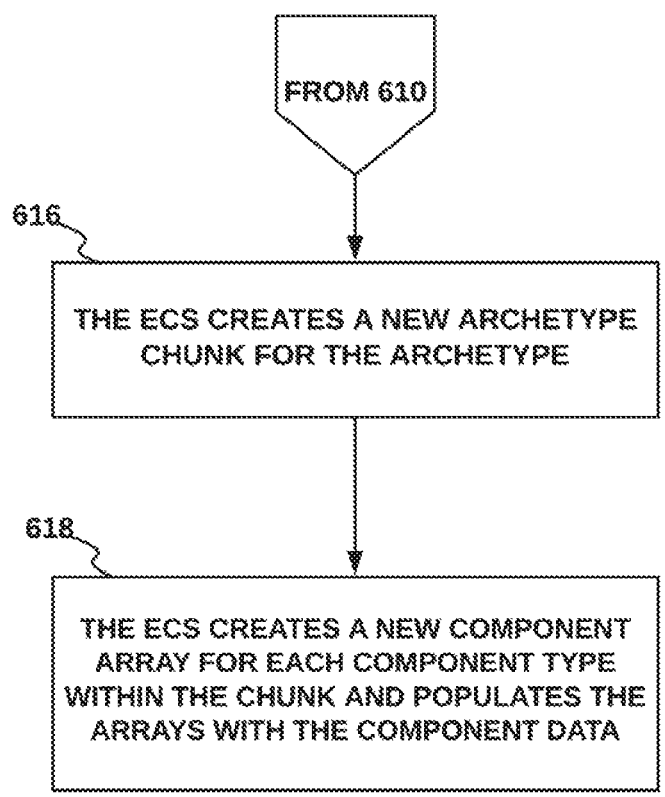

In accordance with an embodiment, and shown in a flowchart in FIG. 7A and FIG. 7B is a computer-implemented method 600 by which the ECS module 114 converts an object-oriented programming (OOP) game object (e.g., with a class structure) into an entity. The computer-implemented method 600 (hereafter referred to as "the method 600") is performed by a computing device (e.g., such as the ECS device 101) including at least one hardware processor and a memory 102. In accordance with the embodiment, in process 602, the ECS module 114 receives an OOP game object (e.g., from an external module) which is to be converted to an entity. At process 604, the ECS module 114 analyzes the data therein. During the analysis, the ECS module extracts a list of OOP components from the OOP game object, and OOP data that defines each of the components on the list. The OOP data represents variables in OOP programming. At process 606, the ECS module 114 extracts the OOP data (e.g., variables) for component on the list. For example, an OOP game object might have 4 components with each of the 4 components having distinct variables such that the ECS module 114 extracts the variables for each of the 4 components. At process 608, the ECS module 114 uses the extracted list of components to classify the OOP object into an existing entity archetype (e.g., one that was created in memory 102 previously) by comparing the components in the list with the components in existing archetypes in the ECS environment. If the list of components from the OOP object is an exact match to a list of components for one of the existing archetypes, then the OOP object is compatible with the matched existing archetype. Based on the OOP object component list matching an existing archetype component list, at process 612, for each component in the OOP game object, the ECS module 114 adds the data from the OOP component to the associated ECS component data array within a chunk associated with the matched existing archetype. In accordance with an embodiment, the data is added to the end of component data array (e.g., because the component data array is always fully packed with data). The entity ID data for the component data array is also updated to include the added component data. Based on the OOP object component list not matching an existing archetype component list, at process 616, the ECS module 114 creates a new archetype chunk for the entity. At process 618, for each component type in the OOP game object, the ECS module 114 creates a component data array and adds the data from the OOP component to the component data array within the newly created chunk.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 8:
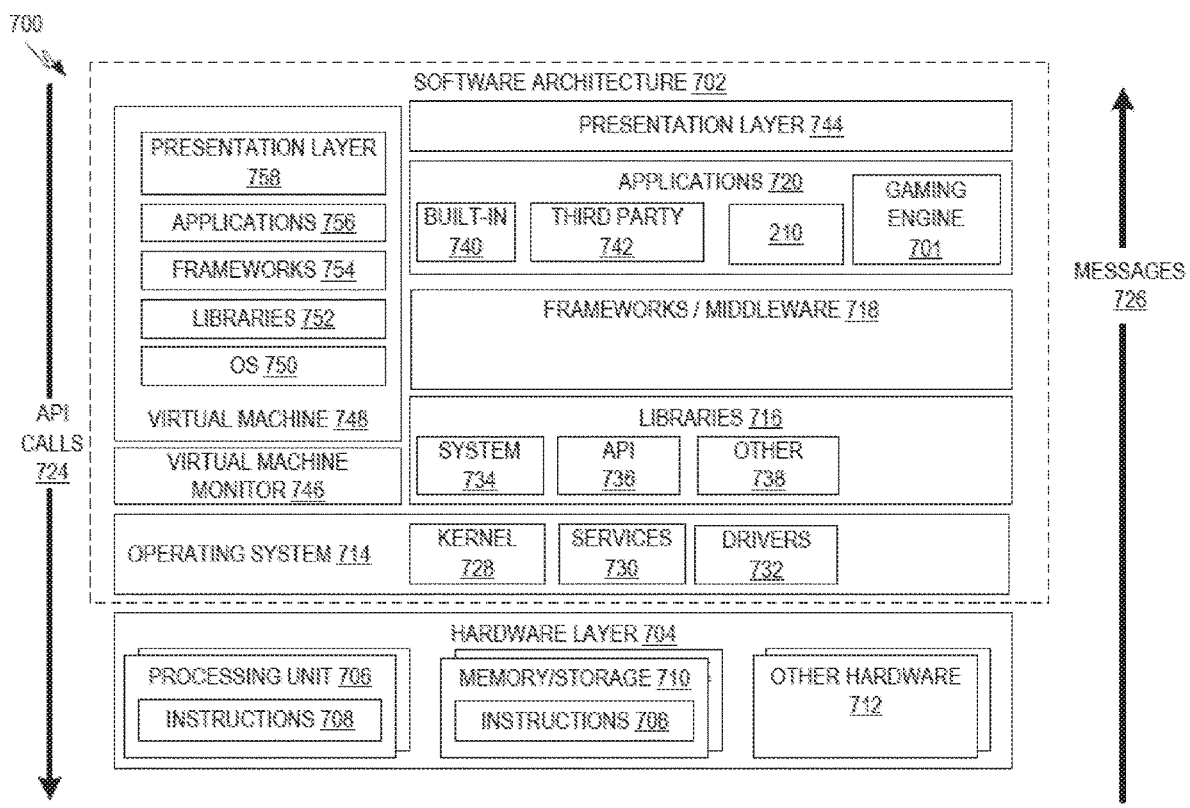
FIG. 8 is a block diagram illustrating an example software architecture, which may be used in conjunction with various hardware architectures described herein.

FIG. 8 is a block diagram 700 illustrating an example software architecture 702, which may be used in conjunction with various hardware architectures herein described to provide a gaming engine 701 and/or components of the entity component system 100. FIG. 8 is a non-limiting example of a software architecture and it will be appreciated that many other architectures may be implemented to facilitate the functionality described herein. The software architecture 702 may execute on hardware such as a machine 800 of FIG. 9 that includes, among other things, processors 810, memory 830, and input/output (I/O) components 850. A representative hardware layer 704 is illustrated and can represent, for example, the machine 800 of FIG. 9. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 8, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 8, this is illustrated by a virtual machine 748. The virtual machine 748 creates a software environment where applications/modules can execute as if they were executing on a hardware machine (such as the machine 800 of FIG. 9, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 9:
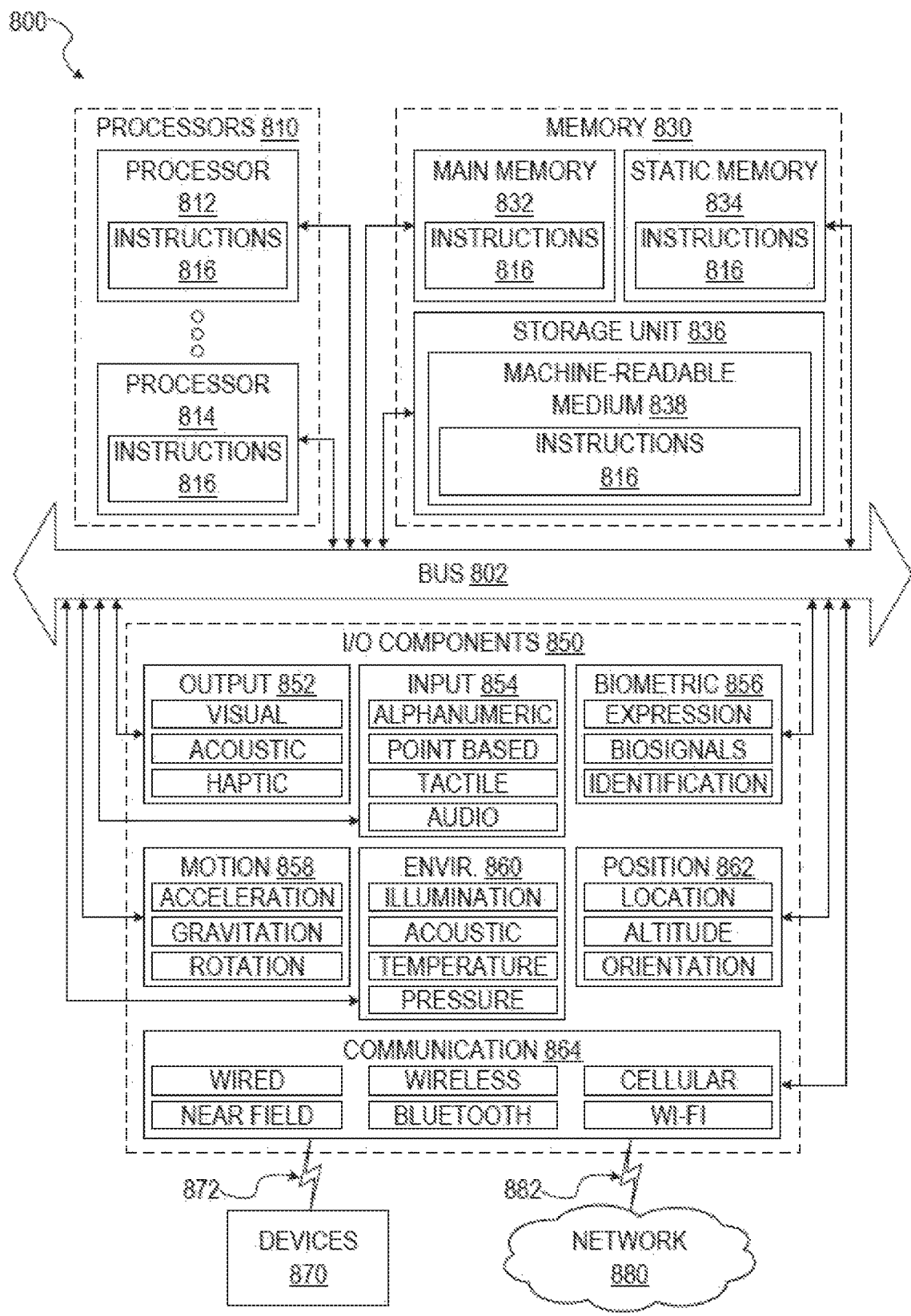
FIG. 9 is a block diagram illustrating components of a machine, according to some example embodiments, configured to read instructions from a machine-readable medium (e.g., a machine-readable storage medium) and perform any one or more of the methodologies discussed herein.

FIG. 9 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the ECS device 101. Specifically, FIG. 9 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 9 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 9. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
one or more computer processors;
one or more computer memories;
a set of instructions incorporated into the one or more computer memories, the set of instructions configuring the one or more computer processors to perform operations for automatically managing a set of memory chunks within the one or more computer memories at a runtime for a computer application, the operations comprising:
receiving a set of entities associated with the computer application, a first entity of the set of entities including data pertaining to a first set of components, a second entity of the set of entities including data pertaining to a second set of components;
associating the first set of components and the second set of components with a first archetype of a set of archetypes based on a number of components in the first set of components and types of the components in the first set of components being the same as a number of components in the second set of components and types of the components in the second set of components; and
populating a memory chunk of the set of memory chunks, the populating of the memory chunk including placing data pertaining to a first component of the first set of components at a first memory location within the memory chunk and placing data pertaining to a first component of the second set of components in a second location of the memory chunk, the first location being contiguous with the second location based on a type of the first component of the first set of components and a type of the first component of the second set of components being of a first type of a plurality of types.

2. The system of claim 1, the populating of the memory chunk further comprising placing data pertaining to a second component of the first set of components at a third memory location within the memory chunk and placing data pertaining to a second component of the second set of components at a fourth memory location within the memory chunk, the third location being contiguous with the fourth location based on a type of the second component of the first set of components and a type of the second component of the second set of components being of a second type of the plurality of types.

3. The system of claim 1, wherein the first memory location is accessible via a first index corresponding to the data pertaining to the first component of the first set of components and the data pertaining to the first component of the second set of components and the second memory location is accessible via a second index corresponding to the data pertaining to the first component of the first set of components and the data pertaining to the first component of the second set of components.

4. The system of claim 2, wherein the third memory location is accessible via a first index corresponding to the data pertaining to the second component of the first set of components and the data pertaining to the second component of the second set of components and the fourth memory location is accessible via a second index corresponding to the data pertaining to the second component of the first set of components and the data pertaining to the second component of the second set of components.

5. The system of claim 2, further comprising receiving a first list of components, a second list of components, and a set of instructions for modifying components within the first list of components, the operations further comprising:
searching the set of archetypes for one or more matching archetypes, wherein a matching archetype includes at least the components from the second list of components; and
using the set of instructions to modify one or more components in the one or more matching archetypes based on a correspondence between the one or more components and the first list of components.

6. The system of claim 5, wherein the set of instructions includes a list of entities from the set of entities and an additional set of instructions for modifying entities on the list of entities, and wherein the modifying of the one or more components includes modifying, according to the additional set of instructions, one or more values within a component associated with an entity included in the list of entities.

7. The system of claim 1, wherein each entity of the set of entities is associated with one or more of a digital object occurring within the application during the runtime and an event occurring within the application during the runtime.

8. The system of claim 2, the operations further comprising:
receiving a notification from the computer application dunrig a runtime, the notification including a description of a modified entity from the first archetype, the modification including one of a deletion or an addition of a component to the modified entity;
classifying types of components within the modified entity;
based on a determination of a correspondence between the classified types and types within a matching archetype of the set of archetypes, removing data belonging to the modified entity from the first archetype and populating a memory chunk associated with the matching archetype.

9. A non-transitory computer-readable medium comprising a set of instructions that, when executed by one or more computer processors, causes the one or more computer processors to perform operations for automatically managing a set of memory chunks within one or more computer memories at a runtime for a computer application, the operations comprising:
receiving a set of entities associated with the computer application, a first entity of the set of entities including data pertaining to a first set of components, a second entity of the set of entities including data pertaining to a second set of components;
associating the first set of components and the second set of components with a first archetype of a set of archetypes based on a number of components in the first set of components and types of the components in the first set of components being the same as a number of components in the second set of components and types of the components in the second set of components; and populating a memory chunk of the set of memory chunks, the populating of the memory chunk including placing data pertaining to a first component of the first set of components at a first memory location within the memory chunk and placing data pertaining to a first component of the second set of components in a second location of the memory chunk, the first location being contiguous with the second location based on a type of the first component of the first set of components and a type of the first component of the second set of components being of a first type of a plurality of types.

10. The non-transitory computer-readable medium of claim 9, the populating of the memory chunk further comprising placing data pertaining to a second component of the first set of components at a third memory location within the memory chunk and placing data pertaining to a second component of the second set of components at a fourth memory location within the memory chunk, the third location being contiguous with the fourth location based on a type of the second component of the first set of components and a type of the second component of the second set of components being of a second type of the plurality of types.

11. The non-transitory computer-readable medium of claim 9, further comprising receiving a first list of components, a second list of components, and a set of instructions for modifying components within the first list of components, the operations further comprising:
   searching a set of archetypes for one or more matching archetypes, wherein a matching archetype includes at least the components from the second list of components; and
   using the set of instructions to modify one or more components in the one or more matching archetypes based on a correspondence between the one or more components and the first list of components.

12. The non-transitory computer-readable medium of claim 11, wherein the set of instructions includes a list of entities from the set of entities, and wherein the modifying of the data includes modifying, according to the additional set of instructions, one or more values within a component included in the list of entities, the component included in the first set of components or the second set of components.

13. The non-transitory computer-readable medium of claim 9, wherein each entity of the set of entities is associated with one or more of a digital object occurring within the application during the runtime and an event occurring within the application during the runtime.

14. The non-transitory computer-readable medium of claim 9, the operations further comprising:
   receiving a notification from the computer application during a runtime, the notification including a description of a modified entity from the first archetype, the modification including one of a deletion or an addition of a component to the modified entity;
   classifying types of components within the modified entity;
   based on a determination of a correspondence between the classified types and types within a matching archetype of the set of archetypes, removing data belonging to the modified entity from the first archetype and populating a memory chunk associated with the matching archetype.

15. A method comprising:
performing operations for automatically managing a set of memory chunks within one or more computer memories at a runtime for a computer application, the operations comprising:
   receiving a set of entities associated with the computer application, a first entity of the set of entities including data pertaining to a first set of components, a second entity of the set of entities including data pertaining to a second set of components;
   associating the first set of components and the second set of components with a first archetype of a set of archetypes based on a number of components in the first set of components and types of the components in the first set of components being the same as a number of components in the second set of components and types of the components in the second set of components; and
   populating a memory chunk of the set of memory chunks, the populating of the memory chunk including placing data pertaining to a first component of the first set of components at a first memory location within the memory chunk and placing data pertaining to a first component of the second set of components in a second location of the memory chunk, the first location being contiguous with the second location based on a type of the first component of the first set of components and a type of the first component of the second set of components being of a first type of a plurality of types.

16. The method of claim 15, the populating of the memory chunk further comprising placing data pertaining to a second component of the first set of components at a third memory location within the memory chunk and placing data pertaining to a second component of the second set of components at a fourth memory location within the memory chunk, the third location being contiguous with the fourth location based on a type of the second component of the first set of components and a type of the second component of the second set of components being of a second type of the plurality of types.

17. The method of claim 15, further comprising receiving a first list of components, a second list of components, and a set of instructions for modifying components within the first list of components, the operations further comprising:
   searching a set of archetypes for one or more matching archetypes, wherein a matching archetype includes at least the components from the second list of components; and
   using the set of instructions to modify one or more components in the one or more matching archetypes based on a correspondence between the one or more components and the first list of components.

* * * * *

UNITED STATES PATENT AND TRADEMARK OFFICE
CERTIFICATE OF CORRECTION

PATENT NO. : 11,132,289 B2  
APPLICATION NO. : 16/814921  
DATED : September 28, 2021  
INVENTOR(S) : Ante et al.

Page 1 of 1

It is certified that error appears in the above-identified patent and that said Letters Patent is hereby corrected as shown below:

In the Claims

In Column 24, Line 10, in Claim 5, delete "claim 2," and insert --claim 1,-- therefor In Column 24, Line 34, in Claim 8, delete "claim 2," and insert --claim 1,-- therefor In Column 24, Lines 36-37, in Claim 8, delete "dun rig" and insert --during-- therefor Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*